United States Patent [19]

Reynolds et al.

[11] Patent Number: 4,508,012
[45] Date of Patent: Apr. 2, 1985

[54] HIGH PRESSURE HYDRAULIC SYSTEMS

[75] Inventors: Desmond H. J. Reynolds; Phillip A. Taft, both of West Midlands, England

[73] Assignee: Lucas Industries Public Limited Company, Birmingham, England

[21] Appl. No.: 551,122

[22] Filed: Nov. 14, 1983

[30] Foreign Application Priority Data

Nov. 24, 1982 [GB] United Kingdom ............... 8233554

[51] Int. Cl.³ .................... F15B 13/044; F15B 13/06
[52] U.S. Cl. ........................................ 91/512; 91/459; 280/6 H; 280/6.1; 280/DIG. 1; 251/139; 251/141
[58] Field of Search ................ 280/6 H, 6.1, DIG. 1; 91/390, 512, 459; 251/139, 141

[56] References Cited

U.S. PATENT DOCUMENTS

| 3,071,393 | 1/1963 | Valentine | 280/DIG. 1 |
| 3,390,892 | 7/1968 | Van Winsen et al. | 280/6.1 |
| 3,830,138 | 8/1974 | Joneleit | 91/390 |
| 4,390,188 | 6/1983 | Rouse | 280/6 H |

FOREIGN PATENT DOCUMENTS 659206 3/1963 Canada ............................ 280/6.1

Primary Examiner—Paul E. Maslousky
Attorney, Agent, or Firm—Oldham, Oldham & Weber Co.

[57] ABSTRACT

In a high pressure hydraulic system a slave unit is supplied with fluid from a source through a control valve assembly. The assembly has a valve mechanism to control flow between ports communicating with the source and slave unit. The valve mechanism has two members, a first member controlling flow through the first port in response to a spring, a solenoid, and the pressure differential, the solenoid being unable to move the member against a significant pressure differential, and a second member controlling flow through the second port in dependence on the first member, the pressure differential and a spring. The first port has an elastomeric seal preventing leakage when the port is closed. The system has particular advantages when it is used as a vehicle suspension levelling system, in which an electronic control system controls the supply of fluid from an accumulator through a manifold and control valve assemblies to hydraulic suspension struts in accordance with ride height signals.

15 Claims, 4 Drawing Figures

HIGH PRESSURE HYDRAULIC SYSTEMS

SPECIFIC DESCRIPTION

This invention relates to high pressure hydraulic systems of the kind in which a slave unit, for example an hydraulic suspension strut of a vehicle hydraulic suspension system, is supplied with fluid under pressure from a source through a control valve assembly which is operative to maintain the slave unit in a desired condition.

In an hydraulic system of the kind set forth, it is important to control leakage past the control valve assembly when the source is inoperative. Elastomeric seals may be used to control leakage, but if a valve with such a seal opens against a pressure differential the seal is liable to extrusion. The seal must resist extrusion if it is to have a reasonable life, but as the pressure in the system is raised the seal needs to be made of stiffer material to resist extrusion, and eventually a pressure is reached where the stiffness required reduces the sealing efficiency to an unacceptable level. Pressures above this will be defined as "high pressures".

Further, it is desirable to minimise the force required to operate valves in the control valve assembly, so that, for example, if the valves are solenoid-operated, the current taken by the solenoids will not be excessive.

In one known high pressure hydraulic system of the kind set forth the control valve assembly comprises two solenoid-operated valves, oppositely acting and arranged in series between the source and the slave unit, each valve being closed to prevent flow through the valve in one direction and opened to permit flow in both directions under the control of the solenoid and the pressure differential acting across the valve, with a seating portion of one valve being of elastomeric material to provide a leakproof seal when that valve is closed.

In another known high pressure hydraulic system of the kind set forth, the control valve assembly has first and second ports communicating with the source and the slave unit respectively, and a valve member movable between alternative closed positions in which it closes either the first or the second port, and an open position in which communication between the ports is permitted, movement of the valve member being controlled by the pressure differential acting across it, fluid flow past the valve member and a solenoid associated with each port, with an elastomeric seal to provide a leakproof seal when the first port is closed by the valve member.

In these known constructions therefore leakage from the slave unit past the control valve is prevented by the leakproof seal, but that seal is able to resist extrusion as the solenoids are not sufficiently powerful to open the valves against a significant pressure differential. However, these constructions have the disadvantage that the provision of two solenoids makes the assembly relatively complex and expensive to manufacture, and the second construction relies on fluid flow to operate the valve, whch may not be totally reliable.

According to our invention, in a high pressure hydraulic system of the kind set forth the control valve assembly has first and second ports communicating with the source and slave unit respectively, and valve means for controlling fluid flow between the ports, the valve means being movable to close either the first or the second port, or to permit communication between the ports, the valve means comprising two relatively movable valve members, a first valve member for controlling fluid flow through the first port, movement of the first valve member being controlled by first biassing means urging the first valve member to close the first port, a solenoid producing a force urging the first valve member to open the first port, and the pressure differential across the first valve member, such that the solenoid force is unable to move the first valve member against a significant pressure differential, and a second valve member for controlling fluid flow through the second port, movement of the second valve member being controlled by the first valve member, the pressure differential across the second valve member, and second biassing means urging the second valve member to close the second port, and the control valve assembly incorporates elastomeric sealing means to provide a substantially leakproof seal when the first port is closed.

Providing one solenoid instead of two means that the control valve assembly becomes simpler, lighter and less expensive to manufacture, while retaining the advantages of the leakproof seal and small valve-operating forces. Further, the biassing means provide positive closure of the ports by their respective valve members.

The elastomeric sealing means is preferably provided on the first valve member.

When the solenoid is de-energised the position of the valve means is dependent on the pressure differential and the biassing means. Thus if the slave pressure, that is, the pressure in the slave unit is greater than the source pressure, that is, the pressure supplied from the source, the pressure differential and the first biassing means are operative to cause the first valve member to close the first port, while the second port is open. If the source pressure is greater than the slave pressure the pressure differential acts against the first biassing means to cause the first valve member to open the first port, but does not cause the second valve member to close the second port, so that communication between the ports is permitted.

Energisation of the solenoid produces a force which urges the first valve member to open the first port, but the solenoid force is unable to move the first valve member against a significant pressure differential. However, once the first valve member has opened the first port following energisation of the solenoid, it remains open as long as the solenoid remains energised, regardless of the pressure differential. The position of the second valve member is then dependent on the pressure differential and the second biassing means. When the source pressure is greater than the slave pressure the pressure differential and the second biassing means are operative to ensure that the second valve member closes the second port. When the slave pressure is greater than the source pressure the pressure differential acts against the second biassing means, causing the second valve member to open the second port, so that communication between the ports is permitted.

Conveniently the first and second biassing means comprise first and second springs respectively.

Preferably the first spring is stronger than the second spring.

The pressure from the source is preferably normally maintained at a low level, and in operation is manipulated to provide pressure pulses having a range of pressures which includes and exceeds the range of pressures which occur in the slave unit. Normally the solenoid is de-energised, and so since the slave pressure is greater than the source pressure, the first port is closed.

The source preferably comprises an accumulator, from which pressure is supplied to the control valve assembly via a valve and a manifold. Alternatively the pressure source may comprise a pump.

A single source may be used to supply more than one slave unit through a suitable number of control valve assemblies.

Energisation and de-energisation of the solenoid is preferably controlled by an electronic control system, which may also control the supply of pressure from the source.

In one embodiment the slave unit comprises an hydraulic suspension strut for a vehicle. Pressure in the strut can be considered as a static pressure arising from the weight of the vehicle, which varies with changes in vehicle loading, and a dynamic pressure arising from ride movement, superimposed on the static pressure to produce a ripple at ride frequency. Changes in these pressures will cause changes in ride height signals, in response to which the electronic control system manipulates the operation of the source and the control valve asembly to constitute a suspension levelling system.

It is particularly advantageous for such a suspension system to have a stored pressure source, such as an accumulator, as this enables the system to be operated when the means by which the accumulator is charged, suitably an engine-driven or electric pump, is inoperative. The source may supply all the struts of the vehicle from a manifold, with a control valve assembly provided for each strut. Alternatively a single control valve assembly can control more than one strut.

One embodiment of our invention is illustrated in the accompanying drawings, in which.

Figure 1:
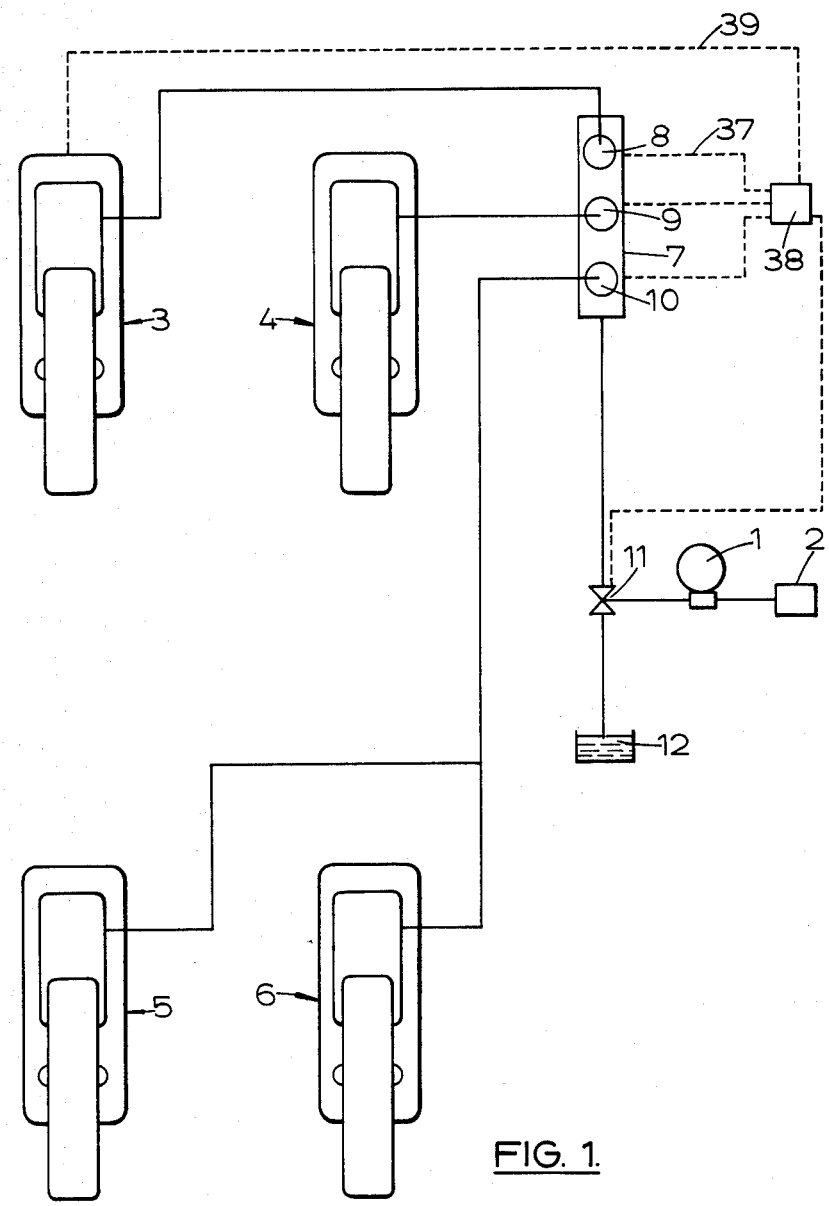
FIG. 1 is a layout of a high pressure system according to our invention.

The layout of FIG. 1 shows a high pressure hydraulic system, in this case a vehicle suspension levelling system. A source of fluid pressure, conveniently an accumulator 1 supplied from an engine-driven pump 2, supplies hydraulic fluid to slave units, comprising four hydraulic suspension struts 3, 4, 5, 6, through a common manifold 7 and control valve assemblies 8, 9 and 10. As illustrated, each strut 3, 4, 5 or 6 is arranged to support a wheel of the vehicle. The struts 3, 4 for the front wheels are supplied through separate valve assemblies 8 and 9 respectively, while the struts 5, 6 for the rear wheels are supplied through a common valve assembly 10.

Figure 3:
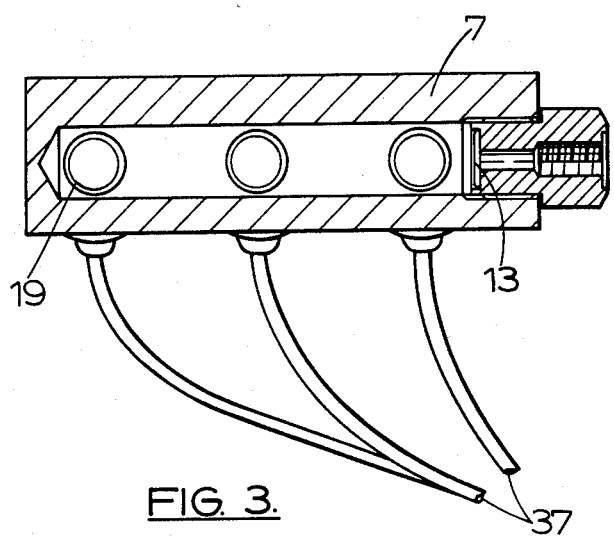
FIG. 3 is a section on the line 3—3 of FIG. 2.

A three-way valve 11 is interposed between the accumulator 1 and the manifold 7, the valve 11 being adapted to connect the manifold 7 either to the accumulator 1 or to a reservoir 12 at atmospheric pressure. As can be seen in FIG. 3, a filter 13 is located in the connection between the manifold 7 and the valve 11.

Figure 2:
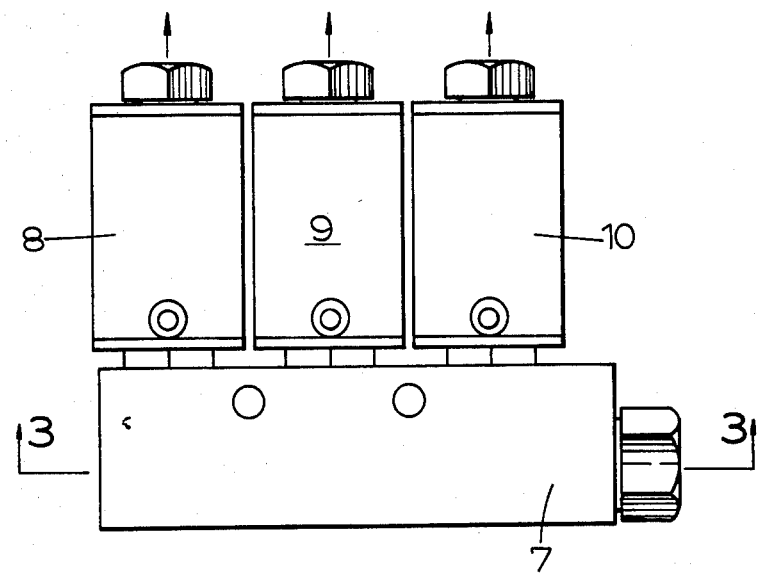
FIG. 2 is a side view of part of the system of FIG. 1, including the control valve assemblies.
Figure 4:
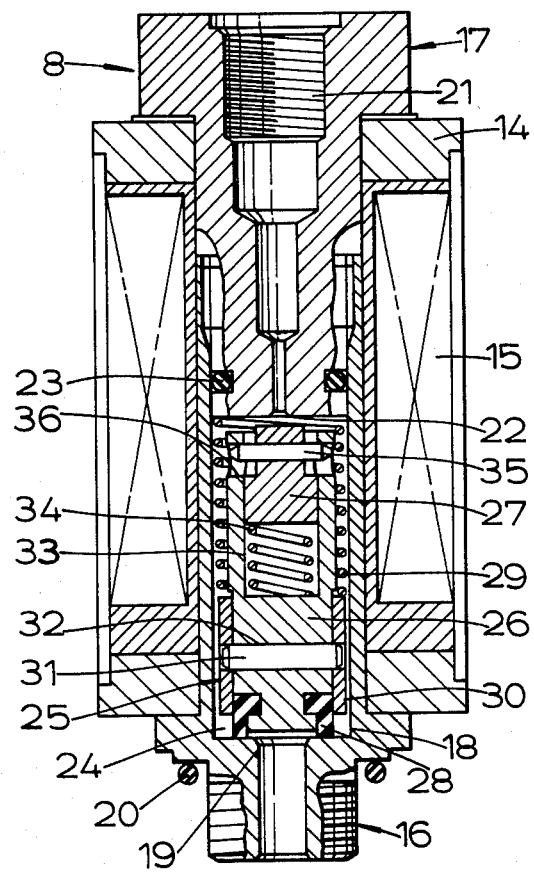
FIG. 4 is a longitudinal section through a control valve assembly.

The manifold 7 is shown in detail in FIGS. 2 and 3, while the detailed construction of the control valve assembly 8 (9 and 10 are identical) is shown in FIG. 4.

The assembly 8 has a cylindrical housing portion 14 in which is located a solenoid winding 15. Two housing end portions 16, 17 of stepped outline are also provided. The first of these, 16, is of non-magnetic material and has a stepped bore 18, part of which forms a first port 19. A seal 20 seals the end portion 16 against the manifold 7. The second end portion 17 is of magnetic material, and has a stepped bore 21, an inner portion of which forms the second port 22. At its outer end the bore 21 is screw-threaded for connection to a line (not shown) leading to the strut 3. A seal 23 seals between the two end portions 16, 17. A cavity 24 is defined between the two end portions 16, 17, in which is located a valve means 25.

The valve means 25 comprises two relatively movable valve members 26, 27. A first valve member 26 is adapted to control fluid flow through the first port 19. The first valve member 26 has an elastomeric seat 28 to provide a substantially leakproof seal when the first port 19 is closed. The valve member 26 is urged to close the first port 19 by first biassing means comprising a spring 29, which acts between the end portion 17 and an abutment ring 30 located round the first valve member 26. The abutment ring 30 is attached to the first valve member 26 by a pin 31 which passes through a diametral hole 32 in the valve member 26. The first valve member 26 is of magnetic material so that it is responsive to energisation and de-energisation of the solenoid 15, and is also responsive to the pressure differential across it. Energisation of the solenoid 15 magnetises the stationary end portion 17 and the valve member 26, which produces a force urging the valve member 26 inwardly in order to open the first port 19. However, the arrangement is such that this force is not sufficient to move the valve member 26 against a significant pressure differential.

The second valve member 27 is adapted to control fluid flow through the second port 22. The second valve member 27 slides in a blind bore 33 at the inner end of the first valve member 26, and is urged towards the second port 22 by a second biassing means comprising a spring 34 acting between the first and second valve members. The second valve member 27 is connected to the first valve member 26 by a pin 35 working in a slot 36 in the first valve member, to provide limited relative movement between the valve members. The second valve member 27 is therefore controlled by the first valve member 26 and the spring 34, and also by the pressure differential acting across it. However, the solenoid 15 does not affect the second valve member 27, which is of non-magnetic material.

The assembly 8 is arranged so that when the solenoid 15 is de-energised the position of the valve means 25 depends on the pressure differential and the biassing means. If the strut pressure is greater than the manifold pressure the assembly is in the position shown in FIG. 4, with the pressure differential and the first spring 29 acting to ensure that the first valve member 26 closes the first port 19. The second port 22, however, remains open. If the manifold pressure is greater than the strut pressure, the pressure differential acts against the first spring, and the valve members move into a balanced state in which both the first and second ports 19 and 22 are open, thus permitting fluid flow.

Energisation of the solenoid 15 moves the first valve member 26 into abutment with the inner end of the housing end portion 17 and opens the first port 19, provided that there is no significant pressure differential opposing the solenoid force. Once the first valve member 26 is in this position it remains there as long as the solenoid is energised, regardless of the pressure differential. The position of the second valve member 27 is then dependent on the pressure differential and the second spring 34. When the manifold pressure is higher than the strut pressure the pressure differential and the second spring 34 ensure that the second port 22 is closed. When the strut pressure is greater than the manifold pressure the pressure differential acts against the spring 34, moving the second valve member 27 relative to the first to open the second port 22, permitting fluid flow between the ports.

The solenoids 15 of the assemblies 8, 9, 10 are connected by leads 37 to an electronic control 38, which is also connected to the three-way valve 11, and receives ride height signals from the struts through connections 39 (only that for the strut 3 is shown). This forms an electronic control system, which works in response to the ride height signals to control energisation and de-energisation of the solenoids and to control the three-way valve 11 to provide in the manifold pressure pulses with a range which includes and exceeds the range of pressures occuring in the struts 3, 4, 5, 6, in order to regulate the fluid flow into and out of the struts.

In operation, the pressure in the manifold 7 is normally low, and the solenoids 15 are de-energised, so that the valve means of each assembly 8, 9, 10 is in the position shown in FIG. 4, with the first valve member 26 closing the first port 19, the elastomeric seat 28 providing a leakproof seal.

Considering the operation of one assembly only, say the assembly 8, if no adjustment of the strut 3 is required when the manifold pressure is pulsed, the solenoid of the valve assembly 8 is energised when the pulse starts. When the manifold pressure reaches the strut pressure the solenoid force moves the first valve member 26 to open the first port 19, but the second valve member 27 then closes the second port 22, so that no fluid flow is allowed. When the manifold pressure decreases the solenoid is de-energised, so that the pressure differential and the springs 29 and 34 return the valve members 26, 27 to their original positions.

If the pressure in the strut 3 is to be increased, the associated solenoid 15 is not energised at the beginning of the pulse. Thus, when the manifold pressure exceeds the strut pressure the first port 19 is opened to allow fluid flow into the strut 3. When the desired strut pressure is reached the solenoid is energised, and, as the valve member 26 is balanced, the solenoid force is able to move the first valve member inwardly, allowing the second valve member 27 to close the second port 22, so that further fluid flow into the strut 3 is prevented. On decrease of the manifold pressure the solenoid 15 is de-energised so that the valve members 26, 27 return to their original positions.

If the pressure in the strut 3 is to be decreased, the associated solenoid is energised at the start of the pulse, so that the valve means moves to close the second port 22 when the manifold pressure reaches the strut pressure. On decrease of the manifold pressure the pressure differential acts on the second valve member 27, moving it against the force in the spring 34 to open the second port 22 to allow fluid to flow out of the strut 3. When the desired strut pressure is reached the solenoid 15 is de-energised, so that the valve members return to their original positions.

Any of these three operations can be performed during one manifold pressure pulse, so that each control valve assembly can operate its strut or struts independently of the others. Levelling of the vehicle can therefore be performed in one pressure pulse by appropriate control of the solenoids 15. The control system may also control the pressure pulses as required. Thus, if the strut pressure is to be decreased, the manifold pressure may be decreased once it has reached strut pressure.

The use of the accumulator 1 has the advantage that the system is able to operate even when the engine, and thus the pump 2, are switched off, so that the vehicle will automatically level itself if the load on it is varied after the engine has been switched off. Alternatively the pump 2 may be electrically operated, and wired into the vehicle ignition system.

In a modification the source of pressure may comprise a pump, which may be electric, and arranged so that it can operate even when the ignition system is switched off, thus enabling the levelling system to operate at any time.

The control valve assemblies 8, 9, 10 provide a simple and light construction as they have only one solenoid. The use of one solenoid also has the advantage of simplifying the control of the system. The use of the biassing means provides positive closure of the two ports by their respective valve members.

The control valve assembly can be used in other systems where these features are advantageous. The relative forces provided by the solenoid and the biassing means may be altered to suit the operating pressure and operation of the system.

We claim:

1. A high pressure hydraulic system comprising a source of hydraulic pressure, a control valve assembly and a slave unit, fluid under pressure being supplied to said slave unit from said source through said control valve assembly, said control valve assembly comprising a housing provided with first and second ports, said first port communicating with said source and said second port communicating with said slave unit, and valve means controlling fluid flow between said ports, said valve means being movable to close either said first port or said second port or to permit communication between said ports, said valve means comprising first and second relatively movable valve members, first and second biassing means, means for applying a pressure differential across each said valve member, and a solenoid means, said first valve member controlling flow through said first port, and being operated by forces produced by said first biassing means, said solenoid means and said pressure differential applying means, said first biassing force urging the first valve member to close said first port, and being less than said solenoid force urging said first valve member to open said first port, said solenoid force being of a predetermined value such that if said first biassing force and said pressure differential force together oppose and exceed said predetermined solenoid force, said solenoid means is unable to move said first valve member to open said first port; and said second valve member controlling flow through said second port, said second valve member being operated by said first valve member, and by forces produced by said pressure differential applying means and said second biassing means, said second biassing force urging said second valve member to close said second port, and said control valve assembly incorporates elastomeric sealing means to provide a substantially leakproof seal when said first port is closed.

2. A high pressure hydraulic system as claimed in claim 1, wherein said elastomeric sealing means is provided on said first valve member.

3. A high pressure hydraulic system as claimed in claim 1, wherein, when said solenoid means is de-energised, the position of said valve means is dependent on said pressure differential applying means and said first and second biassing means, such that if the pressure in said slave unit is greater than the pressure applied from said source, the pressure differential and said first biassing means are operative to ensure that said first valve member closes said first port, and said second port is open; and if said source pressure is greater than said slave pressure the pressure differential acts against said first biassing means to cause said first valve member to open said first port, but does not cause said second valve member to close said second port, so that communication between said ports is permitted.

4. A high pressure hydraulic system as claimed in claim 1, wherein, once said first valve member has opened said first port in response to energisation of said solenoid means, said first port remains open as long as said solenoid means remains energised, the position of said second valve member then being dependent on said pressure differential applying means and said second biassing means, such that if said source pressure is greater than said slave pressure the pressure differential and said second biassing means are operative to ensure that said second valve member closes said second port; and if said slave pressure is greater than said source pressure the pressure differential acts against said second biassing means to cause said second valve member to open said second port, so that communication between said ports is permitted.

5. A high pressure hydraulic system as claimed in claim 1, wherein said first and second biassing means comprise first and second springs.

6. A high pressure hydraulic system as claimed in claim 1, wherein said pressure from said source is normally maintained at a low level, and in operation is manipulated to provide pressure pulses having a range of pressures which includes and exceeds the range of pressures which occur in said slave unit.

7. A high pressure hydraulic system as claimed in any claim 1, wherein said source comprises an accumulator.

8. A high pressure hydraulic system as claimed in claim 1, wherein said source comprises a pump.

9. A high pressure hydraulic system as claimed in claim 1, wherein a single source supplies more than one slave unit through a suitable number of control valve assemblies.

10. A high pressure hydraulic system as claimed in claim 1, wherein an electronic control system controls energisation and de-energisation of said solenoid means, and the supply of pressure from said source.

11. A high pressure hydraulic system as claimed in claim 1, wherein said slave unit comprises an hydraulic suspension strut.

12. A high pressure hydraulic suspension levelling system for a vehicle comprising a source of hydraulic pressure, an hydraulic suspension strut associated with each wheel of said vehicle, at least one control valve assembly, fluid under pressure being supplied to each said strut from said source through said control valve assembly or one of said assemblies, and an electronic control system responsive to ride height signals from said struts, each said control valve assembly comprising a housing provided with first and second ports, said first port communicating with said source and said second port communicating with said slave unit, and valve means controlling fluid flow between said ports, said valve means being movable to close either said first port or said second port or to permit communication between said ports, said valve means comprising first and second relatively movable valve members, first and second biassing means, means for applying a pressure differential across each said valve member, and a solenoid means, said first valve member controlling flow through said first port, and being operated by forces produced by said first biassing means, said solenoid means and said pressure differential applying means, said first biassing force urging the first valve member to close said first port, and being less than said solenoid force urging said first valve member to open said first port, said solenoid force being of a predetermined value such that if said first biassing force and said pressure differential force together oppose and exceed said predetermined solenoid force, said solenoid means is unable to move said first valve member to open said first port; and said second valve member controlling flow through said second port, said second valve member being operated by said first valve member, and by forces produced by said pressure differential applying means and said second biassing means, said second biassing force urging said second valve member to close said second port, and each said control valve assembly incorporates elastomeric sealing means to provide a substantially leakproof seal when said first port is closed, with said electronic control system manipulating the operation of said source and said control valve assembly or assemblies in response to said ride height signals.

13. A high pressure hydraulic suspension levelling system as claimed in claim 12, wherein said source comprises an accumulator which supplies said struts for said vehicle from a manifold.

14. A high pressure hydraulic suspension levelling system as claimed in claim 12, wherein each said strut is provided with a control valve assembly.

15. A high pressure hydraulic suspensiong levelling system as claimed in claim 12, wherein a single control valve assembly controls more than one said strut.

* * * * *